Figure 12:
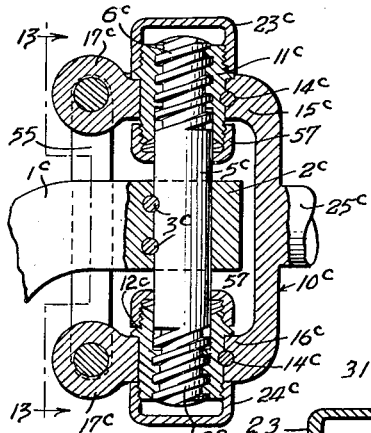

March 14, 1939.   E. J. WESTON   2,150,199
STEERING GEAR FOR VEHICLES
Filed June 10, 1936   5 Sheets-Sheet 1
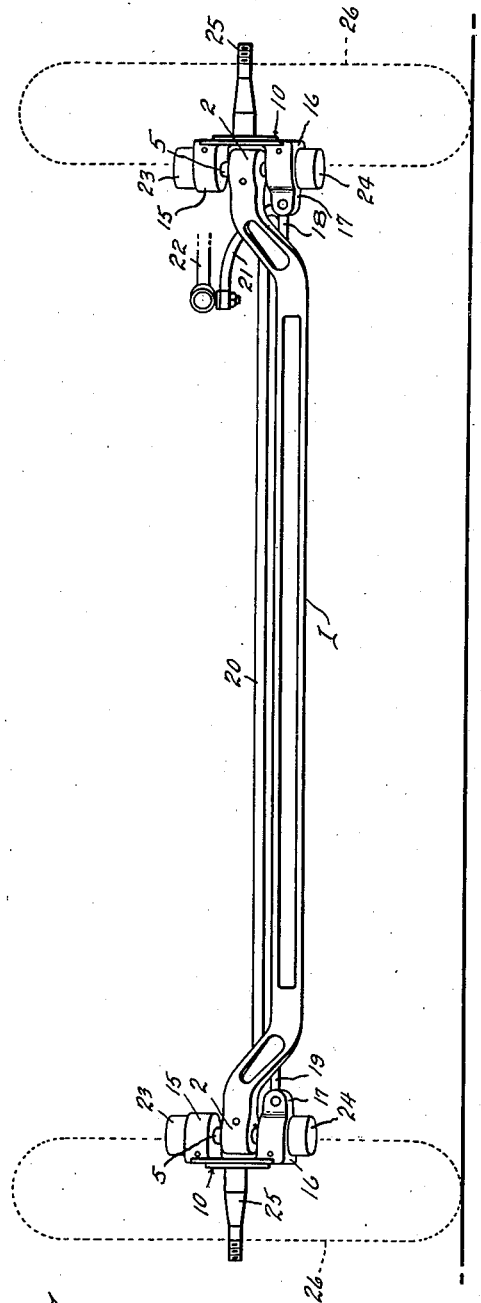
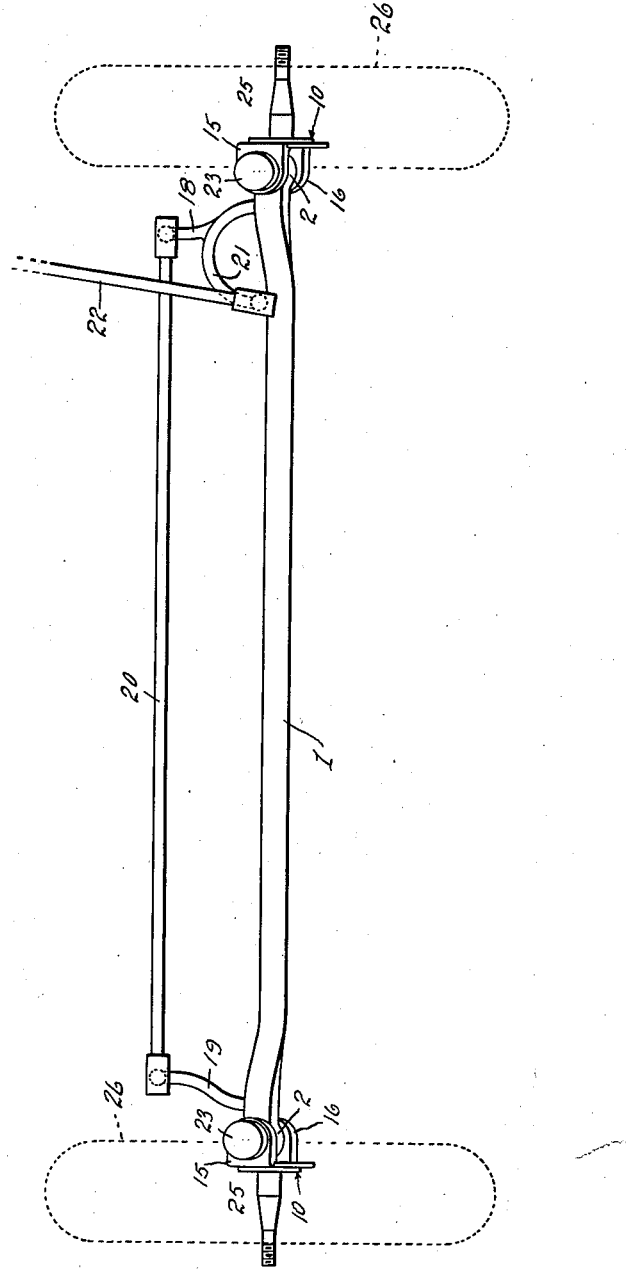
INVENTOR.
Edwin J. Weston
BY Hull, Brock & West
ATTORNEYS

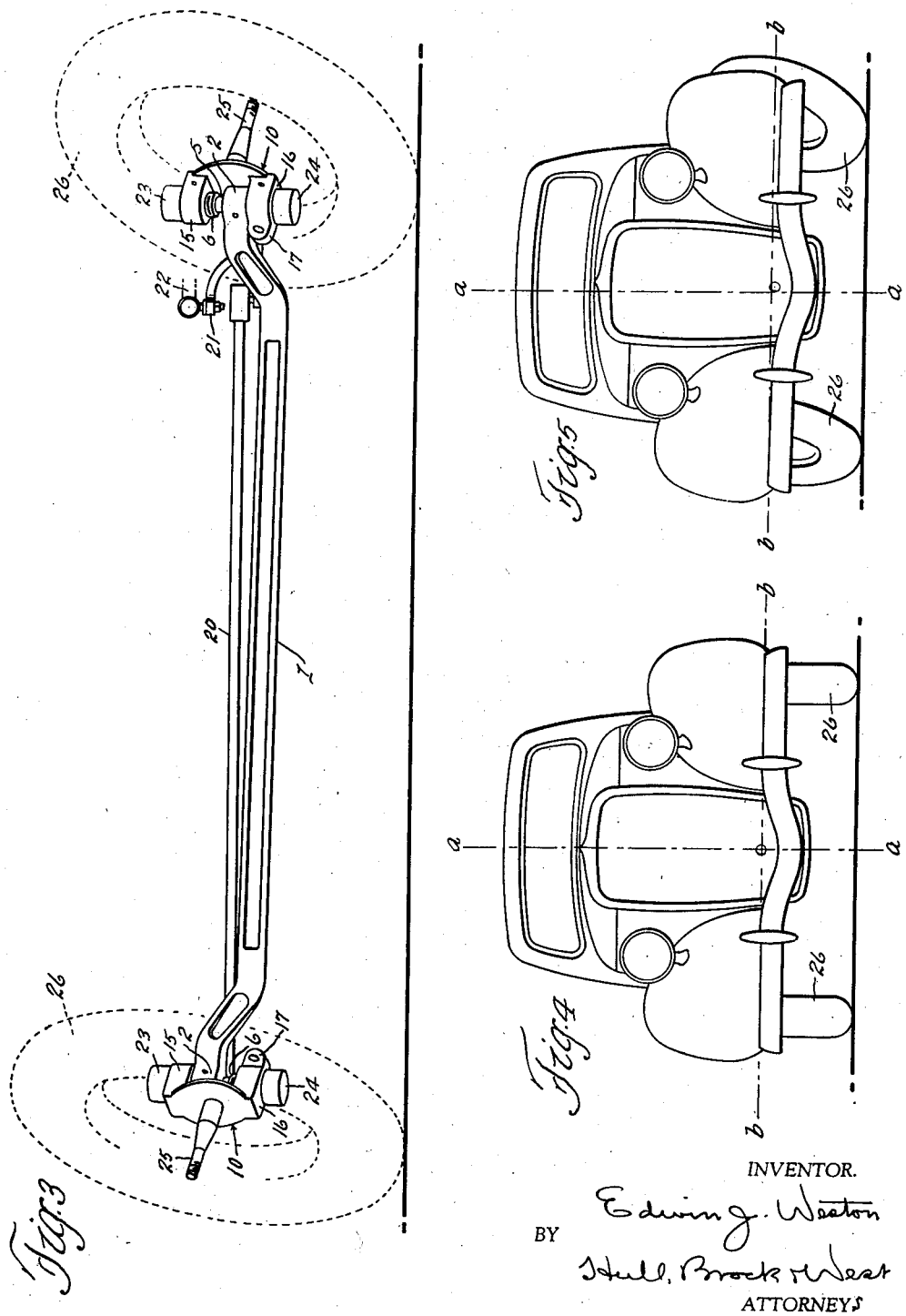

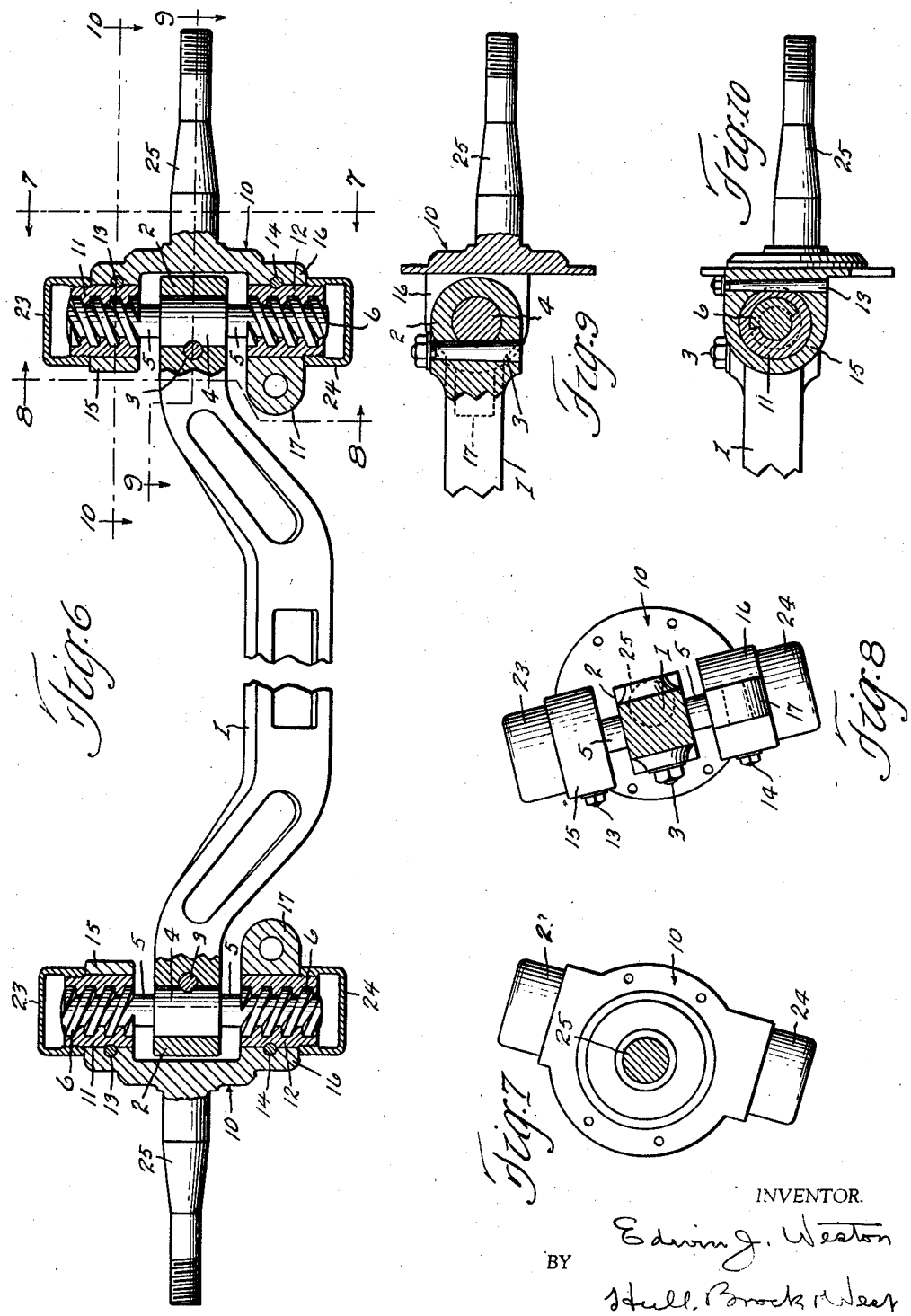

March 14, 1939.　　　E. J. WESTON　　　2,150,199
STEERING GEAR FOR VEHICLES
Filed June 10, 1936　　　5 Sheets-Sheet 4

INVENTOR.
Edwin J. Weston
By Hull, Brock & West
ATTORNEYS.

March 14, 1939. E. J. WESTON 2,150,199
STEERING GEAR FOR VEHICLES
Filed June 10, 1936 5 Sheets-Sheet 5
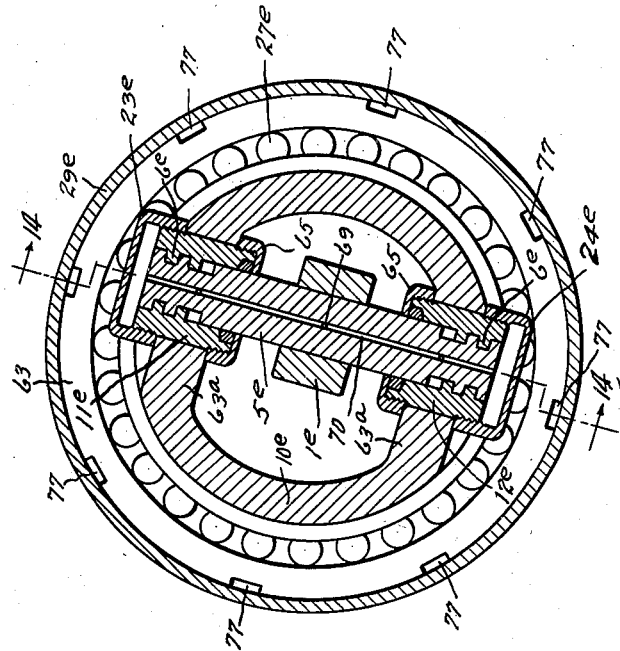
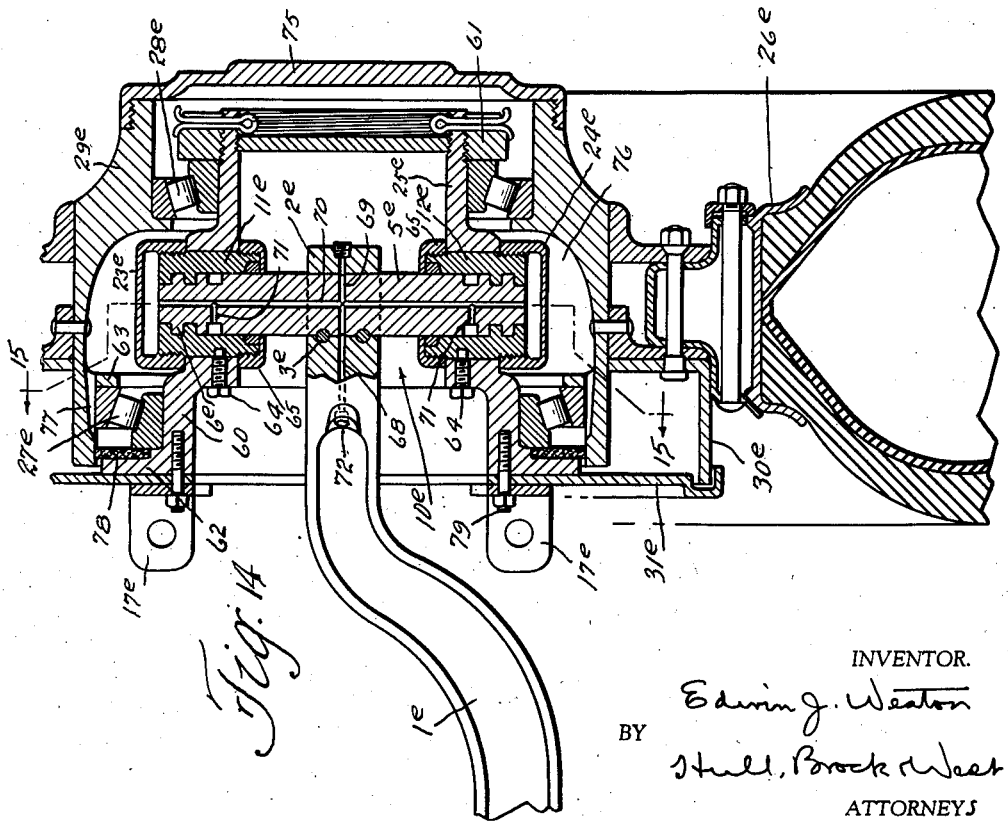
INVENTOR.
Edwin J. Weston
BY
Hull, Brock & West
ATTORNEYS Patented Mar. 14, 1939

2,150,199

UNITED STATES PATENT OFFICE 2,150,199

STEERING GEAR FOR VEHICLES

Edwin J. Weston, Canton, Ohio

Application June 10, 1936, Serial No. 84,513

12 Claims. (Cl. 280—96.1)

This invention relates to improvements in the steering gear or steering mechanism of automotive vehicles, the term being used in its broader sense to include generally the articulated connections between the vehicle structure and the front or steering wheels of the vehicle.

The fundamental purpose of the invention is to provide a construction that will greatly improve the steering and riding qualities of the vehicle, promote safety, effect tire economy, and result in other advantages hereinafter appearing.

In order to convey an impression of how the invention functions I may compare the action of the front or steering wheels of the vehicle when rounding a curve with that of the front wheel of a motorcycle or bicycle, or even with that of a hoop, under like circumstances. The wheels tilt perceptibly toward the inner side of the curve, the inner wheel turning over on its side to a somewhat greater extent than the outer wheel. This alone will tend to "bank" the vehicle as it rounds the curve, but such action is further enhanced by the nature of the pivotal connections between the axle and steering knuckles, the ultimate result being an appreciable drop of the inner end of the axle while the outer end retains substantially its normal elevation. By reason of these factors, i. e., the wheel tilt and the axle tilt, the front end of the vehicle, and consequently its center of gravity, swings over toward the inner side of the curve immediately upon the wheels being turned. In other words, the front of the vehicle is actually thrown into the turn. This action greatly facilitates negotiating the curve under any speed, and it, and the banking action, very decidedly improve the riding comfort as they tend to overcome the centrifugal force which throws passengers toward the side of the vehicle nearer the outer side of the curve. Likewise, less lateral strain is imposed upon the front wheels, notwithstanding their tilted condition, or upon other parts of the vehicle; and the traction of said wheels is increased by the resultant direction of their lines of force upon the road.

By the swing of the vehicle into the turn, as above expressed, and the wheels lying over (in the manner of a hoop, or the wheel of a wheelbarrow, when deflected from a straight course) thereby to naturally influence the mass of the load to assume a curved course, there is less tendency than with the prevailing steering gear for the vehicle to continue in a straight line and consequently slippage of the driving wheels is eliminated and their work reduced and the danger of skidding minimized.

The tilting action of the front wheels obviously results in tire economy because it effects a wider distribution of wear, utilizing the entire tread surface from side to side, thus causing the tire to last longer. Also, as will hereinafter more fully appear, the rolling action of the tire upon the road when the wheel is being turned to right or left, especially when the vehicle is otherwise still, avoids such wear as that incident to the turning of the wheels under like circumstances when the vehicle is equipped with the usual steering gear. Under prevailing practice, when the wheels are turned while the vehicle is at rest or substantially so, there is a rotary grinding of the bearing portion of the tire upon the road.

One very important feature of my improved construction is the inclination of the pivot pins or so-called "king bolts" of the steering heads downwardly and forwardly with respect to the vehicle structure, together with the offsetting of the spindles of the steering knuckles forwardly of the transverse inclined plane of said pins or bolts so as to produce a pronounced caster effect, like that found in motorcycles and bicycles. This arrangement brings about the action above ascribed to the wheels, such action being realized to its fullest extent when the arrangement includes the standard angular disposition or rearward convergence of the steering arms.

This caster effect, besides facilitating the turning of the wheels under all conditions, results in the wheels tending to automatically resume parallelism after a turn is made and the entire front portion of the vehicle to return to normal position.

The banking of the vehicle beyond that resulting from the tilting of the wheels is effected by screws incorporated in the pivot pins of the steering heads. The pitch of the screw threads of the opposed heads are reversed with respect to each other and are such that the end of the axle toward the inner side of the curve will be fed downwardly while the relative movement between the opposite end of the axle and the corresponding screw will be in an upward direction. As a matter of fact, however, the end of the axle toward the outer side of the curve maintains approximately its normal elevation, the feeding upward of such end of the axle by the screw being compensated for by the tilt of the adjacent wheel. As the parts return to normal condition after a curve has been negotiated, the axle naturally assumes horizontal position, the action seeming almost automatic, as above intimated.

In certain embodiments of the invention, I dispose the pivot pin in substantially the central vertical plane of the wheel—meaning a plane perpendicular to the rotating axis of the wheel—very much in the order of the common arrangement wherein the axis of the pivot pin coincides with the point of contact between the tire and road. However, in my improved construction, by reason of the action of the wheel that results from the pronounced inclination of the pivot pin and the forward offsetting of the spindle, the wheel, when it is turned while the vehicle is at rest, rolls upon the supporting surface instead of grinding thereon in the manner above mentioned.

Objects and advantages additional to those hereinbefore pointed out will appear as I proceed to describe the invention in detail by reference to the accompanying drawings wherein several modifications of the invention are illustrated.

Figure 11:
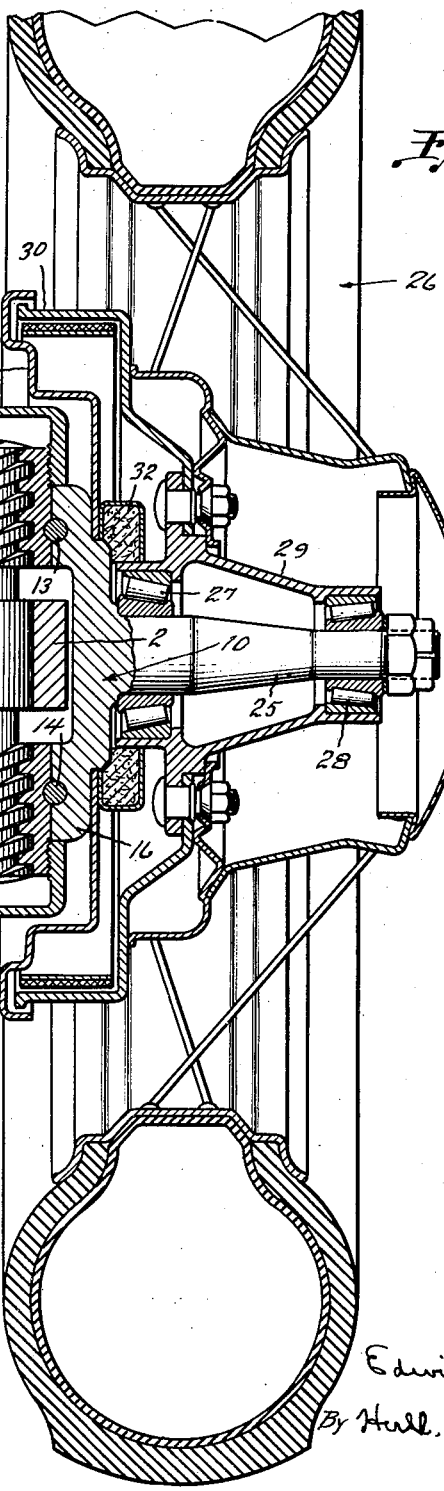
Figure 13:
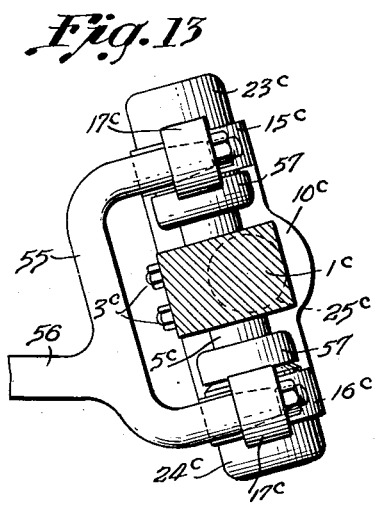

In the drawings, Fig. 1 is a front elevation and Fig. 2 a plan view of a front axle incorporating my improvements, both views showing the parts in normal position or with the steering knuckles straight; Fig. 3 shows the axle in front elevation with the steering knuckles turned, the wheels in this and the preceding views being indicated in dotted lines; Figs. 4 and 5 are diagrammatic views showing a vehicle in front elevation and indicating, respectively, its condition when the steering wheels are straight, and when they are turned; Fig. 6 is a sectional front elevation of the axle, the picture plane being parallel to the longitudinal axes of the pivot pins of the steering knuckles and the central portion of the axle being broken away to permit of a larger scale; Figs. 7, 8, 9 and 10 are sectional details on the respective correspondingly numbered section lines of Fig. 6; Fig. 11 is a central vertical section through a wheel of standard construction showing it mounted on one of the spindles of my improved axle of the form illustrated in the preceding views; Figs. 12 and 13 are sectional views at right angles to each other of a modified form of the invention, the latter view being a section on the line 13—13 of Fig. 12; and Figs. 14 and 15 are details of an embodiment of the invention especially adapted for heavy duty, each being a section on the appropriately designated section line of the other view.

In the form of the invention illustrated in Figs. 1 to 11, the axle, designated 1, may consist of the usual forging, and its end portions are offset upwardly and terminate in cylindrical bosses 2. Said end portions are shown as twisted slightly so as to incline the axes of the bosses 2 downwardly and forwardly with respect to the vertical plane of the axle. For convenience of illustration, in Fig. 6 the body portion of the axle is swung rearwardly to dispose the bosses 2 with their axes vertical, it being well to explain at this point that all views of the drawings, excepting side elevations and plans, are taken as though looking rearwardly from a position in front of the vehicle.

Secured, as by tapered pins 3, within bores of the bosses 2 are equatorial enlargements 4 of pivot pins (sometimes called king bolts) 5. The end portions of the pivot pins 5 have relatively steep threads 6, a double thread being shown in the present instance; and the threads of the two pivot pins associated, respectively, with the opposite ends of the axle are reversed with respect to each other. As will be seen by reference to Fig. 6, the pivot pin at the right hand end of the view, or at the left hand end of the axle if considered from the driver's position as is customary, has right hand threads, and the one at the opposite end has left hand threads.

A steering knuckle, designated generally by the reference numeral 10, is pivotally and threadedly connected to each of the pins 5. In the present instance this is accomplished through threaded bushings 11 and 12 that are secured, as by tapered pins 13 and 14, within openings in the upper and lower branches 15 and 16, respectively, of a fork that constitutes a part of the steering knuckle.

Formed on the inner side of the lower branch 16 of each of the steering knuckles 10 is an eye 17 for the attachment, in the ordinary way, of the usual steering arm. These arms are shown in Figs. 1, 2 and 3, and the one adjacent the right hand end of the views is designated 18 and the one at the left hand end is designated 19. According to common practice, the rear ends of the steering arms are connected together by a tie rod 20, and to the end of a branch 21 of the arm 18 is connected the forward end of the drag link 22.

The bushings 11 and 12 extend above and below the respective branches 15 and 16 of the steering knuckles, and the protruding ends of the bushings are threaded for the application of relatively deep caps 23 and 24, the depth of said caps allowing for the axial movement of the pivot pins with respect to the steering knuckles.

Incorporated in each of the steering knuckles 10 is a spindle 25 that is offset forwardly from the transverse inclined plane of the axis of the adjacent pivot pin 5. It is the combination of this offset arrangement of the spindles and the pronounced inclination of the pivot pins that is responsible for the caster effect previously referred to, and for the wheel action hereinbefore described. A further factor contributing to the action ascribed to the wheels is the standard rearward convergence of the steering arms 18 and 19. As is well known, this causes the wheel on the inner side of the curve to assume a sharper angle than the wheel on the outer side when the vehicle is turned.

Mounted on the spindles 25 are the wheels designated generally by the reference numeral 26. Fig. 11 shows the standard wheel of a well known make of automobile mounted on the spindle of my improved axle through inner and outer roller bearings 27 and 28, respectively, said bearings being fitted within the corresponding ends of the hub 29 to which is fastened the brake drum 30. The brake housing plate 31 is especially formed to accommodate the steering knuckle of my improved axle, and the joint between the knuckle and hub is sealed against leakage by the standard grease baffle 32.

With reference especially to Figs. 1 to 6, the operation of the steering gear will now be described. When the wheels are actuated to make a left turn, as shown in Figs. 3 and 5, the steering knuckle at the right hand end of the axle, as the parts are viewed in the drawings, will rotate on the axis of the corresponding pivot pin 5 in a counterclockwise direction as looked down upon by the observer from his present position and in so doing will feed said pin downwardly so as to depress the corresponding end of the axle. At the same time, the spindle 25 of said steering knuckle will swing to the rear, assuming an outward and downward inclination, and as a result thereof the wheel 26 that is mounted on said spindle will lie over somewhat on its side, as clearly shown in the views last referred to. The pronounced inclination of the wheel, coupled with the feeding downward of the pivot pin 5, lowers the adjacent end of the axle quite perceptibly. With respect to the steering knuckle at the opposite end of the axle, the spindle 25 thereof will swing forwardly to an upwardly inclined position so as to tilt the wheel that is mounted thereon inwardly and rearwardly at the top, but both the inclination and deflection of this wheel will be less than the inclination and deflection of the other because of the angular relation, or rearward convergence, of the steering arms 18 and 19, as will be readily understood. When the steering knuckle now under consideration swings as aforesaid, it will, through the threads 6, elevate (with respect to itself) the corresponding pivot pin 5 and consequently the adjacent end of the axle. This relative elevation of the axle, however, is practically neutralized by the inclination of the adjacent wheel and by the forward offset of the spindle, such inclination of the wheel, plus the spindle offset, dropping the forked end of the steering knuckle approximately a distance equal to the axial movement of the pivot pin.

The effect of the turning of the wheels on the forward end of the body of the vehicle may be ascertained from a comparison of Figs. 4 and 5. The vertical lines a—a and the horizontal lines b—b are the same in the two views, and it will be noted that, in Fig. 5, where the steering wheels are turned, the front of the vehicle is shifted with respect to said lines a material distance in the direction of the turn and is inclined downwardly toward the inner side of the turn, thereby moving the center of gravity toward the inside instead of the outside of the curve and producing substantially the same effect as if the curve of the road were banked. The advantages of this action are fully set out hereinbefore.

In describing the succeeding embodiments of the invention, in the order of their occurrence in the drawings, the same reference numerals that are applied to the parts of the preceding forms, augmented by the respective exponents c and e, will be employed for designating the corresponding parts of said embodiments. Additional numerals will be introduced to indicate distinctive elements as they are met. It should also be stated that in the ensuing illustrations only one end of the axle is shown, although it will be understod that both ends are the same with the exception of the pitch of the threads on the pivot pins, those of the opposed pins being reversed with respect to each other.

Figs. 12 and 13 show a form of the invention in which the pivot pin 5c is secured, as by tapered pins 3c, within the bore of a boss or terminal portion 2c of the axle 1c. Threaded bushings 11c and 12c cooperate with threads 6c on the upper and lower end portions of the pivot pin and are locked as by tapered pins 14c within the axially aligned apertures in the top and bottom branches 15c and 16c of a fork incorporated in the steering knuckle 10c. The steering knuckle also includes the forwardly offset spindle 25c, and the branches 15c and 16c have ears 17c to which the terminals of a yoke 55 are secured that forms a part of a steering arm 56. Caps 23c and 24c are applied to the threaded upper and lower ends of the respective bushings 11c and 12c, while packing glands 57, applied to the ends of the said bushings inside the fork of the steering knuckle, effectively close the joint between the bushings and the pivot pin so as to exclude dust and dirt and retain a lubricant.

Figs. 14 and 15 show an embodiment of the invention that is designed for use especially on heavy vehicles, such as trucks, fire apparatus, busses and the like.

The steering knuckle 10e includes axially spaced cylindrical portions of different diameters, the one of smaller diameter being toward the outer end of the knuckle and constituting the spindle 25e, and the other, designated 60, being located adjacent the inner end of the knuckle. A hub 29e is mounted upon said cylindrical portions of the knuckle through the roller bearings 27e and 28e, the latter being held on the spindle 25e by the nut 61, and the other being held against the base of a flange 62 at the inner end of the cylindrical portion 60 by an inwardly extending flange 63 of the hub.

Intermediate the spindle 25e and the cylindrical portion 60, opposed parts of the steering knuckle are flattened, as shown at 63a in Fig. 15, and said portions are provided with axially aligned apertures within which are secured, by set screws 64, the bushings 11e and 12e. To the outer ends of the bushings are threadedly connected the caps 23e and 24e, and to their inner ends are similarly attached packing gland nuts 65.

The pivot pin 5e is fastened, as by tapered pins 3e, within the terminal portion or boss 2e of the axle 1e, and the ends of said pin have double threads 6e for cooperation with the internal double threads of the bushings 11e and 12e. The terminal portion or boss 2e of the axle is provided with a duct 68 that registers with a transverse duct 69 of the pivot pin, and the latter bisects an axial passageway 70 of said pin. This passageway opens through the ends of the pin into the caps 23e and 24e, and communicates through lateral ducts 71 with the bearing areas of the spindle and aforesaid bushings adjacent the inner ends of the threads 6e. By the use of an oil or grease cup, or by means of a lubricant gun, connected to the duct 68 of the axle, preferably at the point designated 72, a suitable lubricant may be forced through the ducts 68 and 69 and the passageway 70 to the interior of the caps 23e and 24e and, through the ducts 71, to the threaded connections between the pivot pin and bushings so as to keep the parts well lubricated, the glands on the inner ends of the bushing serving to exclude dust and dirt and to retain the lubricant.

A suitable lubricant is also introduced into the space between the hub and steering knuckle, access to which space may be had by removal of the hub cap 75. It will be noted that the space occupied by the bearing 27e communicates with an annular chamber 76, outwardly beyond the flange 63, through channels 77; and when the wheel is rotating, lubricant that collects in the lower part of the chamber 76, and into which the lubricant drains from the space occupied by the bearings 27e through the channels 77, will be carried upwardly from the sump at the bottom of the chamber by the hub as it rotates and will drain inwardly to the bearing 27e and outwardly to the bearing 28e so as to keep both bearings well lubricated. I recommend grease as the lubricant, and as the wheel operates the grease becomes heated and liquefied and acts in the manner above described. A lubricant retainer 78 carried by the flange 62 of the steering knuckle and engaging the inner end of the hub 29ᵉ serves to prevent escape of the lubricant from the interior of the hub to the brake drum 30ᵉ which is closed by the housing plate 31ᵉ. Lugs 17ᵉ, for the connection of the steering arm, are fastened, as by studs 79 to the inner end of the steering knuckle, the housing plate 31ᵉ being disposed between the base of said lugs and said end of the knuckle.

The lubricating feature just described is reserved as the subject matter for a subsequent application.

Having thus described my invention, what I claim is:

1. In a steering gear for vehicles of the class described, in combination with a vehicle axle, pivot pins rigidly connected to the ends of the axle in parallelism with each other and with their axes inclined downwardly and forwardly, said pins being threaded above and below the axle, and forked steering knuckles whose branches are pivotally mounted on the threaded portions of the pins, said knuckles incorporating spindles whose axes are offset forwardly from the transverse inclined plane of the axes of the pivot pins.

2. In a steering gear for vehicles of the class described, in combination with an axle having terminal portions provided with bores whose axes are inclined downwardly and forwardly with respect to the vertical plane of the axle, pivot pins fastened intermediate their ends in said bores, the upper and lower end portions of the pins being threaded, the threads of the pin at one end of the axle being reversed with respect to those of the pin at the other end, and steering knuckles having parts mounted on the threaded end portions of the pins, the pitch of the threads being such that when the knuckles are turned, as in the negotiation of a curve, the end of the axle toward the inner side of the curve will be depressed and the opposite end elevated with respect to the steering knuckles, said knuckles incorporating spindles whose axes are offset forwardly from the transverse inclined plane of the pivot pins.

3. In a steering gear for vehicles of the class described, in combination with an axle of the vehicle having cylindrical bosses formed on its ends that are provided with axial bores, the axes of said bores being inclined downwardly and forwardly with respect to the vertical plane of the axle, pivot pins extending through said bores, means for locking the pins against rotation with respect to the bosses, the upper and lower end portions of the pins being threaded, the threads of the pin at one end of the axle being reversed with respect to the threads of the pin at the other end, and forked steering knuckles whose upper and lower branches are threadedly mounted on the corresponding end portions of the pins whereby the knuckles have both a pivotal and screw connection with the pins, the pitch of the threads being such that when the knuckles are turned, as in the negotiation of a curve, the end of the axle toward the inner side of the curve will be depressed and the opposite end elevated with respect to the steering knuckles, said knuckles incorporating spindles whose axes are offset forwardly from the transverse inclined plane of the axes of the beforementioned bores.

4. In a steering gear for vehicles of the class described, in combination with an axle having its terminal portions provided with bores whose axes are inclined downwardly and forwardly with respect to the vertical plane of the axle, pivot pins having their central portions secured within said bores and incorporating threads above and below the axle, internally threaded bushings mounted on the threaded end portions of the pivot pins, forked steering knuckles whose branches are provided with aligned apertures within which said bushings are secured, the respective bushings extending above and below the top and bottom branches of the knuckles, and caps fitted to the protruding ends of the bushings, the knuckles incorporating spindles whose axes are offset forwardly from the transverse inclined plane of the axes of the previously mentioned bores.

5. In a steering gear for vehicles of the class described, in combination with an axle having its terminal portions provided with bores whose axes are inclined downwardly and forwardly with respect to the vertical plane of the axle, pivot pins having equatorial enlargements fitted within said bores and incorporating threads above and below the axle whose external diameter is not greater than the diameter of said bores, means for locking the equatorial enlargements of the pins within the bores, internally threaded bushings mounted on the threaded end portions of the pivot pins, forked steering knuckles whose branches are provided with aligned apertures within which said bushings are fitted, means for locking said bushings within said branches against turning, the respective bushings extending above and below the top and bottom branches of the knuckles, and caps fitted to the protruding ends of the bushings, the knuckles incorporating spindles whose axes are offset forwardly from the transverse inclined plane of the axes of the previously mentioned bores.

6. In a steering gear for vehicles of the class described, in combination with the vehicle structure, wheel mounting parts extending laterally from the opposite sides thereof, pivot pins rigidly connected to the outer ends of said parts in parallelism with each other and with their axes inclined in a fore-and-aft direction, said pins being threaded above and below said parts, and steering knuckles having opposed parts mounted on the threaded portions of the pins for movement relative thereto.

7. In a steering gear for vehicles of the class described, in combination with the vehicle structure, wheel mounting parts extending laterally from the opposite sides thereof and having terminal portions provided with bores whose axes are inclined in a fore-and-aft direction, pivot pins fastened intermediate their ends in said bores and whose end portions are threaded, the threads of the pin at one side of the vehicle being reversed with respect to those of the pin at the other side, and steering knuckles having parts mounted on the threaded end portions of the pins for movement relative thereto.

8. In a steering gear for vehicles of the class described, in combination with the vehicle structure, wheel mounting parts extending laterally from the opposite sides thereof and having terminal portions provided with bores whose axes are inclined in a fore-and-aft direction, pivot pins having their central portions secured within said bores and incorporating threads above and below said parts, internally threaded bushings mounted on the threaded end portions of the pivot pins, steering knuckles having opposed parts provided with aligned apertures within which said bushings are secured, the respective bushings extending above and below the top and bottom of said parts of the knuckles, and caps fitted to the protruding ends of the bushings.

9. In a steering gear for vehicles of the class described, in combination with the vehicle structure, wheel mounting parts extending laterally from the opposite sides thereof and having terminal portions provided with bores whose axes are inclined in a fore-and-aft direction, pivot pins having equatorial enlargements fitted within said bores and incorporating threads above and below the axle whose external diameter is not greater than the diameter of said bores, means for locking the equatorial enlargements of the pins within the bores, internally threaded bushings mounted on the threaded end portions of the pivot pins, steering knuckles having opposed parts provided with aligned apertures within which said bushings are fitted, means for locking said bushings within the apertures of the steering knuckles, the respective bushings extending above and below the aforesaid parts of the knuckles, and caps fitted to the protruding ends of the bushings.

10. In a steering gear for vehicles of the class described, in combination with the vehicle structure, wheel mounting parts extending laterally from the opposite sides thereof, pivot pins rigidly connected to the outer ends of said parts in parallelism with each other and with their axes inclined downwardly and forwardly, said pins being threaded above and below said parts, steering knuckles having opposed parts pivotally mounted on the threaded portions of the pins, said knuckles incorporating spindles whose axes are offset forwardly from the transverse inclined plane of the axes of the pivot pins, and wheels mounted on said spindles, the axes of the pivot pins being disposed substantially in the vertical planes of the points of contact between said wheels and the road.

11. A steering head for vehicles comprising, in combination with the vehicle body structure, a pivot pin connected intermediate its ends to said structure and supported thereby in a downwardly and forwardly inclined position, said pin having a longitudinal passageway that opens through the end portions of the pin, a steering knuckle having opposed parts threadedly connected to the ends of the pin so as to move axially of the pin when the knuckle is turned, caps carried by the knuckle outwardly beyond said parts for enclosing the end portions of the pin, and packing glands surrounding the pin inwardly of said parts and connected to the knuckle, the knuckle including a spindle for the mounting of the steering wheel of the vehicle.

12. A steering head for vehicles comprising, in combination with the vehicle body structure, a pivot pin connected intermediate its ends to said structure and supported thereby in a downwardly and forwardly inclined position, said pin having a passageway throughout its length and being externally threaded at its ends, a steering knuckle having opposed parts threadedly connected to the ends of the pin, caps carried by the knuckle outwardly beyond said parts for enclosing the ends of the pin, and packing glands surrounding the pin inwardly of said parts and connected to the knuckle, the pin including ducts leading from the aforesaid passageway to the threads of the pin and another duct through which a lubricant may be injected into the passageway, the knuckle including a spindle for the mounting of the steering wheel of the vehicle.

EDWIN J. WESTON.